Aug. 19, 1969  M. APPIUS  3,461,987
PRECISION BALANCE
Filed Dec. 22, 1966  4 Sheets-Sheet 1

INVENTOR.
MAX APPIUS
BY Low and Berman
AGENTS

INVENTOR.
MAX APPIUS

United States Patent Office 3,461,987
Patented Aug. 19, 1969

3,461,987
PRECISION BALANCE
Max Appius, Goldach, Switzerland, assignor to Mikrowa Fein-und Schnellwaagen AG, Walzenhausen, Appenzell, Switzerland
Filed Dec. 22, 1966, Ser. No. 603,964
Claims priority, application Switzerland, Jan. 25, 1966, 946/66
Int. Cl. G01g 23/32
U.S. Cl. 177—178  6 Claims

ABSTRACT OF THE DISCLOSURE

A direct-reading single-pan precision beam balance with a scale of parallel lines at one end of the beam, an extension of one of the lines passing through the pivot axis of the beam. The scale is projected on a fixed screen by means of an optical system whose axis has a portion perpendicular to the scale and movably arranged so that the perpendicular portion of the optical axis can be shifted in a path parallel to the position of the zero line on the scale at zero load on the balance.

Background of the invention

This invention relates to beam balances, and particularly to balances for determining weight changes in samples of approximately uniform weight.

It is known to provide balance beams, particularly those of precision balances, with a scale member of glass or like translucent or transparent material and to project an enlarged image of the scale member and of indicia carried thereby on a fixed screen. It is possible in this manner to observe minute angular movements of the beam. A vernier scale or an optical micrometer having a known or ascertainable relative position to the screen may be employed to read the weight of an object carried by the beam from the projected image with great accuracy.

The invention, in its more specific aspects, is concerned with a precision balance for determining weight changes in an object by two successive weighings. Such a balance may be employed in the determination of moisture or ash in butter, cereal grain, tobacco, and like goods. It is often desirable to express the difference of the two weighings before and after a drying or igniting operation in percent of the original weight.

If the indicia on the scale member are calibrated in metric units, for example, to indicate a weight of 10.0 grams if the axis of the projection system sweeps 100 index marks on the scale from a zero mark, the original sample must have a weight of 10.0±0.1% if the ash or moisture content is to be read directly from the balance after the second weighing. It is usually time-consuming and often difficult to take a sample fitting into such a narrow weight range. When the sample is outside the limits indicated, the results of the ash or moisture determination can only be found by a calculation which is always undesirable, and sometimes not practical.

Attempts have been made to compensate for varying original sample weights by shifting weights on the balance beam. Such adjustments, however, cause a change in the oscillating system of the balance, affect the zero point of the balance, and further compensation is necessary for precise results.

Summary of the invention

In the balance of the instant invention, the indicia on the scale member define a plurality of parallel lines one of which intersects the pivot axis of the balance beam. An adjusting mechanism is interposed between the stationary support structure of the balance and the projection system which permits the optical axis of an objective lens member in the system to be shifted in the approximate common direction of the lines, the optical axis being transverse of the lines.

Preferably, the line which intersects the pivot axis is centered in the row of juxtaposed parallel lines while the other lines are arranged symmetrically relative to the center line. One of these other lines, referred to hereinafter as the zero line, intersects the optical axis in the position assumed by the balance beam when the beam does not carry an object to be weighed, and the aforementioned adjusting mechanism shifts the optical axis of the projection system in the direction assumed by the zero line in the afore-mentioned beam position.

For reasons presently to become apparent, it is advisable to include among the indicia on the scale member a circular arc which is centered in the pivot axis of the balance beam and intersects the parallel lines. The screen is equipped with an index mark which may be aligned with the image of the arc by shifting the optical axis of the projection objective. Care must be taken to maintain a constant magnification ratio in the projection system regardless of the position of the optical axis, that is, the relationship between the spacing of the parallel lines on the scale member and the spacing of the images of these lines on the screen must be held constant. This may be achieved by suitably selecting the optical system.

It is convenient to mount the light source of the projection system on the fixed supporting structure of the balance, and to convey the light of the source to the optical axis of the objective lens in the projection system by a flexible, elongated, light-conducting member.

The exact nature of the invention and the manner in which it solves the problems outlined above will become apparent from the following description of a preferred embodiment relating to the annexed drawing.

Description of the preferred embodiment

Figure 1:
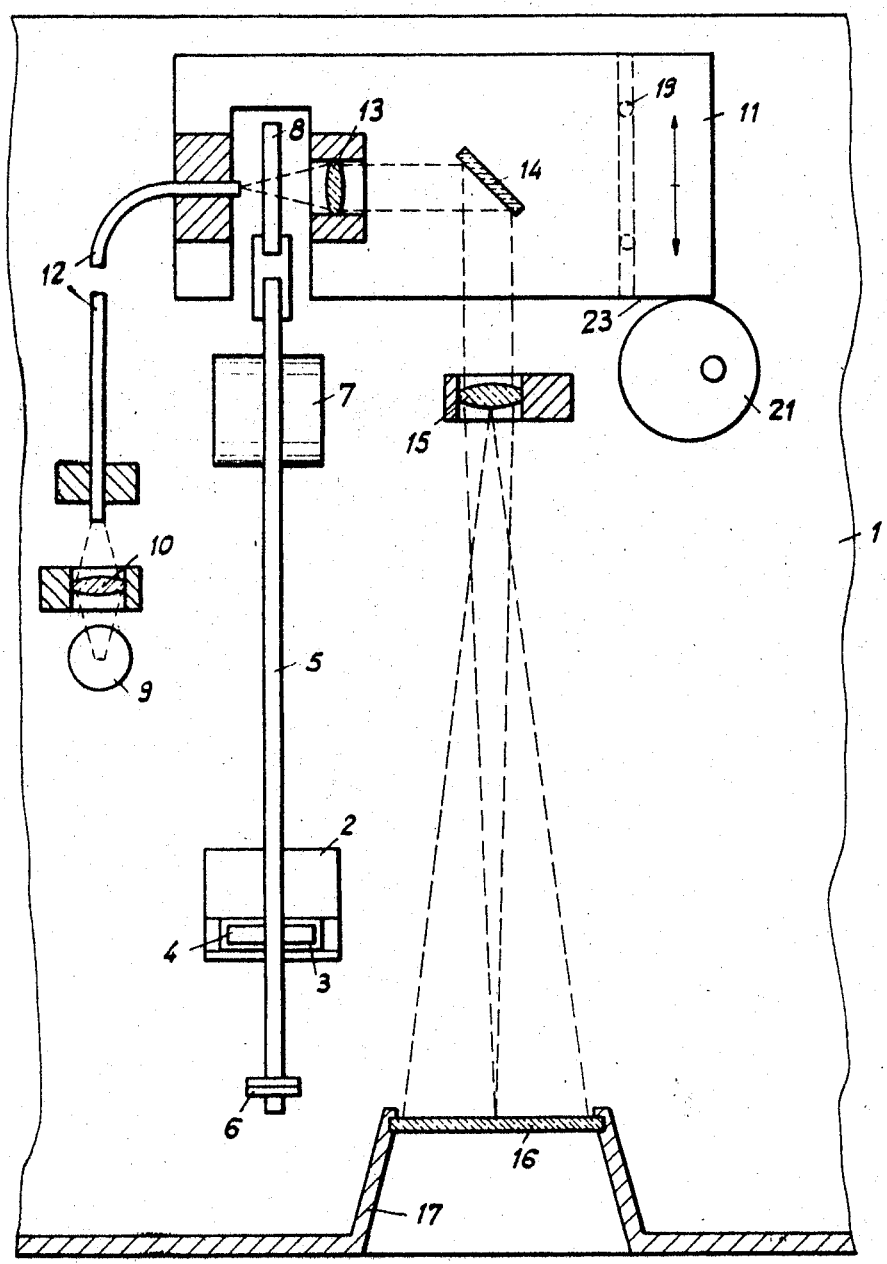
FIGURE 1 shows a balance of the invention in fragmentary plan view, partly in section.
Figure 2:
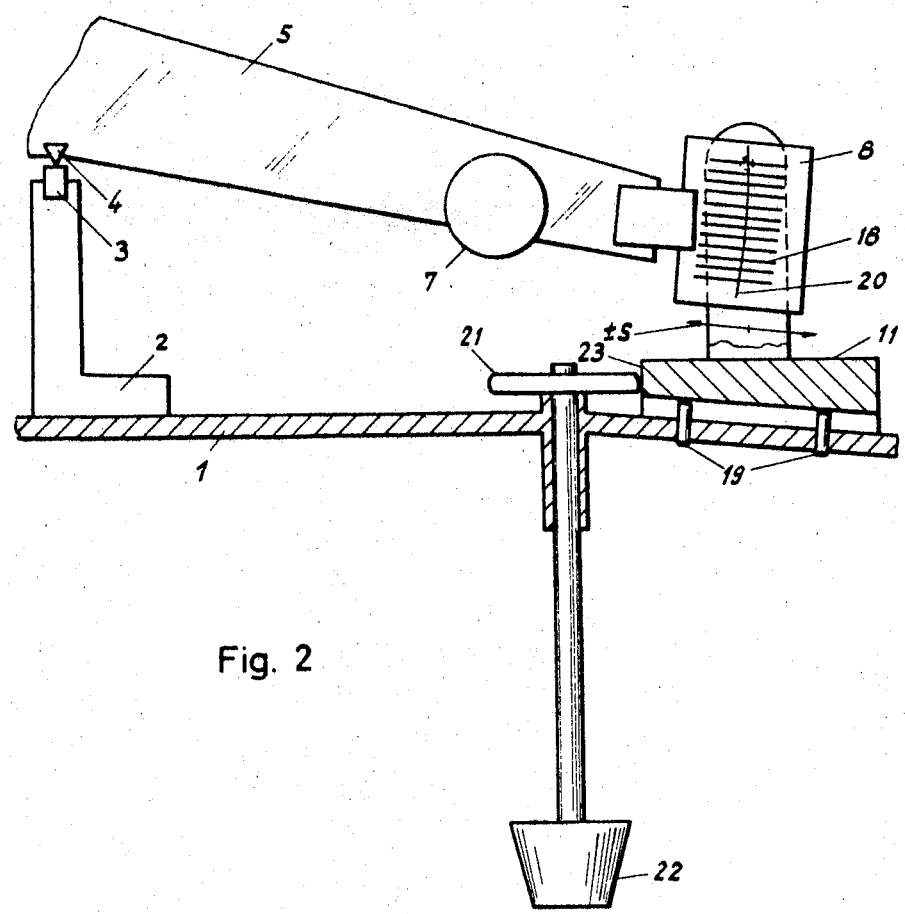
FIGURE 2 is an elevational sectional view of the apparatus of FIGURE 1.

Referring initially to FIGURES 1 and 2, there is seen as much of the stationary supporting structure of a balance of the invention as is needed for an understanding thereof. The supporting structure includes a casing 1 and a bearing bracket 2 which carries a bearing plate 3. A knife edge 4 rests on the plate 3 and carries a beam 5. A knife edge 6 on the shorter arm of the beam 5 is representative of a conventional, simple pan arrangement, not otherwise shown, for carrying an object to be weighed.

The longer arm of the beam 5 is provided with a counterweight 7 and its free end carries a glass plate 8 which is the scale member of the balance. The plate intersects the optical axis of a projection system which includes an electric light bulb 9 as a source of light. The bulb 9 and an associated condenser lens 10 are fixedly mounted on the casing 1 in a conventional manner only partly indicated in the drawing. The light beam emitted by the lens 10 is conveyed to a slide 11 by a flexible rod 12 of light-conducting material, such as a bundle of glass fibers.

The output end of the rod 12 is fixedly mounted on the slide 11 on one side of the scale 8 in alignment with the optical axis of the front element 13 of an objective lens system which also includes a plane mirror 14 and a rear element 15. The scale member 8 is interposed between the rod 12 and the front element 13 whose focal length is selected in such a manner that it projects an image of the scale 8 at an infinite distance. The beam transmitted by the lens 13 is deflected 90° by the mirror 14 to the rear lens 15. The front lens 13 and the mirror 14 are mounted on the slide 11 whereas the rear lens 15 is fixedly mounted on the casing 1. The lens 15 is focused on a translucent screen 16 mounted on the casing 1 by means of a hood 17 which facilitates reading of the image on the screen 16 in bright ambient light. The magnification factor of the image on the screen 11 and its definition are not affected when the mirror 14 moves on the slide 11 toward and away from the rear element 15.

The indicia of the scale 8 consist of figures (omitted from FIGURE 2) and lines engraved into the surface of the scale member which is perpendicular to the pivot axis of the beam 5. A group of parallel spacedly juxtaposed engraved lines 18 extends generally toward the pivot axis. An arcuate line 20 is centered in the pivot axis and intersects the equidistant lines 8.

The slide 11 is guided on the casing 1 by pins 19 which engage a guide slot in the slide. The direction of movement of the slide is indicated by a double arrow ±s (FIGURE 2) which is parallel to the lines 18 in the zero position of the beam 5. The position of the slide 11 is adjusted by a circular, eccentrically mounted cam 21 journaled in the casing 1 and provided with an operating knob 22 outside the casing. A contact face 23 of the slide 11 is held in engagement with the cam 21 by a nonillustrated spring.

Figure 3A:
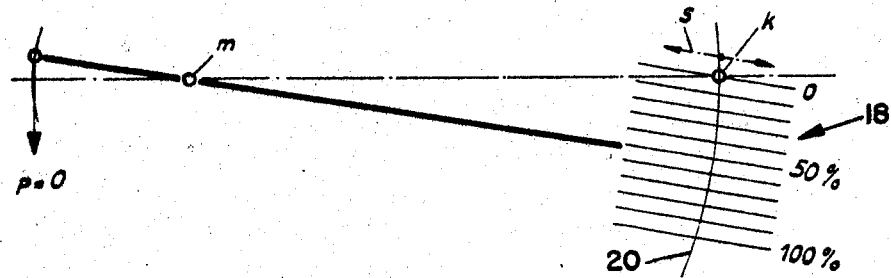
FIGURES 3a, 3b, 3c respectively illustrate spatial relationships in the device of FIGURE 2 in three different operating positions.

The pivot axis of the beam 5 is represented in FIGURE 3a by a small circle $m$, and the beam itself by a heavy line passing through $m$. The beam is shown in the position assumed when the load $p$ on its shorter arm is zero, that is, when the balance pan, not itself illustrated in the drawing, is empty.

The indicia on the scale 8 are represented by a group of eleven parallel and equidistant lines 18 which are intersected by an arc 20 about the pivot axis $m$. In the normal no-load position of FIGURE 3a, the intersection of the terminal zero line in the group of lines 18 with the arcuate line 20 is aligned with the optical axis of the front element 13, indicated by a small circle $k$ in FIGURE 3a, and with the end face of the light conducting bar 12. The direction of movement $s$ of the slide 11 is precisely parallel to the lines 18 in the beam position illustrated in FIGURE 3a.

Figure 3B:
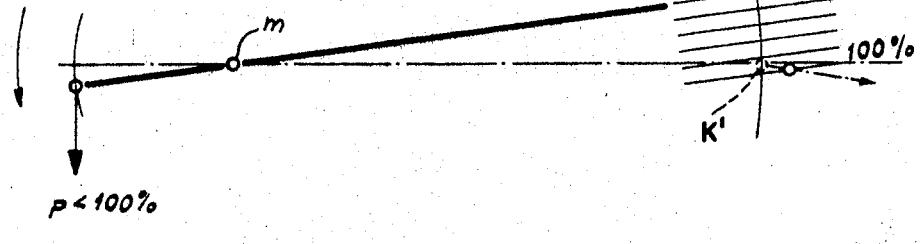

Assuming the normal sample, for which the balance is intended, to be 10.0 g., a beam movement which causes the axis $k$ to travel along the arc 20 from one line 18 to the next corresponds to a weight of 1.0 g. or 10% of normal balance capacity. When the balance is loaded by a sample to less than 100% of normal capacity, as shown in FIGURE 3b, the axis $k$ reaches a position on the arc 20 which is indicated by a circle $k'$ in broken line. The axis may be made to intersect the 100% line by shifting the slide 11 in the direction of the arrow in FIGURE 3b. The actual weight of the sample need not be determined. Later weighings of the treated sample on the balance when adjusted as shown in FIGURE 3b, give direct readings in percent of the original weight.

Figure 3C:

FIGURE 3c similarly shows the position of the scale lines 18 relative to the optical axis of the front element 13 before and after adjustment for a sample whose weight $p$ is greater than the normal 100% rating of the balance.

The weight of ash or of dry residue after moisture removal from the sample can be read with great precision from the screen 16 if the original sample differed by not more than 15% from the 100% rating of the balance. Samples which show a greater deviation from the nominal capacity yield results which are less accurate, but may be adequate for some purposes. It is not difficult to obtain a sample weighing 10±1.5 grams from bulk material by measuring the volume of the sample as by means of a cup. The balance of the invention thus permits any semiskilled or even unskilled operator to determine the percent weight loss of a sample or its residual weight in percent of the original sample without performing any calculations, or at most by subtracting a percentage figure from 100.

The range of accurate readings is reduced if the 50% scale line is not located so that its extension intersects the pivot axis of the balance beam, and the other lines are arranged symmetrically on either side of the 50% line.

Figure 4C:
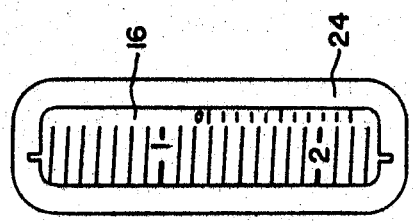
FIGURES 4a, 4b, 4c respectively show the screen of the balance indicating three different conditions of beam loading.
Figure 4B:
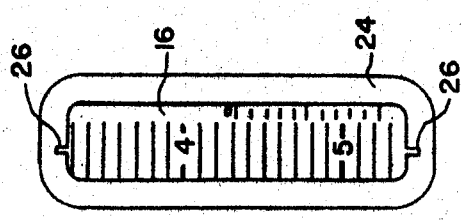
Figure 4A:
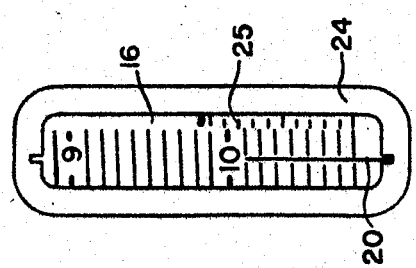

The screen 16 is shown in FIGURES 4a to 4c as it appears to the viewer when different loads are supported on the balance pan. The screen is elongated transversely of the images of the lines 18 on the scale member 8 and is partly covered by a mask 24. While only eleven engraved lines 18 have been shown in FIGURES 2, 3a, 3b, 3c for the sake of clarity, there are actually 101, and the spacing of each pair of juxtaposed lines corresponds to 1% of sample weight. Only portions of about twenty lines are visible simultaneously on the screen 16.

The screen 16 carries a vernier scale 25, and notches 26 in the mask 24 may be aligned with the arcuate line 20. The line 20 need not extend over the entire surface of the scale member 8 but only over terminal portions thereof near the zero weight line.

The balance described above is operated as follows:

The balance is adjusted for zero reading by shifting the weight 7 or in any other conventional manner not illustrated and not directly relevant to this invention. A measured volume of sample is placed on the nonillustrated balance pan. It is usually found that the weight of the sample is different from the nominal balance capacity of 10.0 grams, and the knob 22 is turned until the 100% reading is aligned with the zero mark of the vernier scale.

The sample is then removed from the balance, dried or ignited, and the residue is returned to the balance. Depending on the calibration of the balance, the residual weight of the sample or its weight loss is directly read from the screen 16 by means of the vernier scale 25 to three significant figures.

As is evident from FIGURES 4b and 4c, the percent lines are not always precisely perpendicular to the vernier scale 25 for reasons evident from consideration of FIGURES 3a to 3c. The error introduced thereby is minimal, however, because the full-scale angular deflection of the beam 5 is very small.

Regardless of any adjustment made for aligning the full-load reading of the vernier scale 25 with the corresponding line 18 in the initial weighing of the sample, the reading on the screen 16 reverts to zero when the sample is removed from the balance pan because the optical axis of the objective element 13 is shifted parallel to the direction of the zero line 18 at zero load during the full-load adjustment. The arcuate line 20 permits the balance to be set for its nominal capacity rating at any time by aligning the line 20 with the notches 26. The balance may then be used for single weighing operations.

While the invention has been described with particular reference to a specific embodiment thereof, it is to be understood that it is not limited to the specific features of the example of the invention chosen for the purpose of the disclosure.

What is claimed is:

1. In a balance having a support; a beam member mounted on said support for angular movement about a pivot axis; a scale member mounted on the beam member, the scale member being spaced from said axis and carrying a row of indicia; pan means on the beam for carrying an object to be weighed; screen means on the support; and a projection system mounted on the support and including an objective lens member having an optical axis intersecting said row of indicia, the projection system being adapted to project an image of said indicia on said screen means; the improvement in the projection system and in the indicia which comprises:
 (a) means on said scale member defining a plurality of lines extending in a common direction,
  (1) said lines constituting elements of said indicia, and
  (2) one of said lines intersecting said pivot axis; and
 (b) adjusting means interposed between said support and said projection system for continuously shifting said optical axis substantially in said common direction.

2. In a balance as set forth in claim 1, said lines constituting a row of juxtaposed lines, said one line being centered in said row, and the other lines being arranged symmetrically relative to said one line.

3. In a balance as set forth in claim 1, said lines including a zero line intersecting said optical axis in the position assumed by said beam when the beam does not carry an object to be weighed, said adjusting means including means for shifting said optical axis in the direction of said zero line in said position of said beam.

4. In a balance as set forth in claim 1, means defining a circular arc about said pivot axis on said scale member and constituting part of said indicia, said arc intersecting said lines, and index means on said screen means alignable with the image of said arc by said shifting of said optical axis.

5. In a balance as set forth in claim 1, said optical system including means for maintaining a constant relationship between the spacing of said parallel lines and the spacing of the image of said lines on said screen means while said optical axis is being shifted by said adjusting means.

6. In a balance as set forth in claim 1, said optical system further including a light source fixedly mounted on said support, and a flexible, elongated member of light-conducting material having respective terminal portions mounted in fixed spatial relationship to said light source and to said optical axis.

References Cited
UNITED STATES PATENTS

| | | |
|---|---|---|
| 1,136,694 | 4/1915 | Michalis et al. _____ 177—44 X |
| 3,026,768 | 3/1962 | Appius. |
| 2,731,880 | 1/1956 | Beeson. |
| 3,158,218 | 11/1964 | Van Der Meer _____ 177—178 |
| 3,189,111 | 6/1965 | Ast. |
| 3,358,784 | 12/1967 | Weickhardt _____ 177—178 X |

ROBERT S. WARD, JR., Primary Examiner

G. H. MILLER, JR., Assistant Examiner